United States Patent
Del Regno et al.

(10) Patent No.: US 9,037,746 B2
(45) Date of Patent: May 19, 2015

(54) PSEUDOWIRE CIRCUIT EMULATION

(75) Inventors: Christopher N. Del Regno, Rowlett, TX (US); Howard H. Chiu, Plano, TX (US); Donald Pitchforth, Jr., Rockwall, TX (US); Terry W. McGinnis, Dallas, TX (US); Ronald Dennis Day, Garland, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1433 days.

(21) Appl. No.: 11/747,678

(22) Filed: May 11, 2007

(65) Prior Publication Data

US 2008/0281980 A1 Nov. 13, 2008

(51) Int. Cl.
*G06F 15/173* (2006.01)
*H04L 12/28* (2006.01)
*H04L 12/46* (2006.01)
*H04L 29/06* (2006.01)

(52) U.S. Cl.
CPC ........ *H04L 12/2856* (2013.01); *H04L 12/4633* (2013.01); *H04L 69/08* (2013.01)

(58) Field of Classification Search
USPC ....................................................... 370/466
See application file for complete search history.

(56) References Cited

U.S. PATENT DOCUMENTS

| | | | | |
|---|---|---|---|---|
| 6,832,046 | B1* | 12/2004 | Thomas | 398/72 |
| 7,133,415 | B2* | 11/2006 | Zelig et al. | 370/466 |
| 2001/0015839 | A1* | 8/2001 | Koh et al. | 359/128 |
| 2002/0076142 | A1* | 6/2002 | Song | 385/22 |
| 2002/0085591 | A1* | 7/2002 | Mesh et al. | 370/535 |
| 2002/0171887 | A1* | 11/2002 | Rumer | 359/115 |
| 2003/0012486 | A1* | 1/2003 | Ducellier et al. | 385/17 |
| 2003/0035615 | A1* | 2/2003 | Foltzer | 385/24 |
| 2003/0099231 | A1* | 5/2003 | Betts et al. | 370/369 |
| 2003/0206684 | A1* | 11/2003 | Nishi et al. | 385/17 |
| 2004/0136385 | A1* | 7/2004 | Xue et al. | 370/401 |
| 2007/0071029 | A1* | 3/2007 | White et al. | 370/466 |
| 2008/0270580 | A1* | 10/2008 | Lange et al. | 709/220 |

OTHER PUBLICATIONS

Pseudo-Wire Full-Service Solution, Axerra Networks, 2005, pp./slides: 12, 13 and 15.*

Hideyuki, Sotobayashi et al., Ultrafast Hierarchical OTDM/WDM Network, vol. 1—No. 6 of Systemics, Cybernetics and Informatics, 2003, pp. 101-105.*

* cited by examiner

Primary Examiner — Andrew Goldberg (57) ABSTRACT

A method includes establishing a first pseudowire between a first switching device and a second switching device. The method also includes receiving customer traffic that includes time division multiplexed data and formatting the time division multiplexed data as packets. The method further includes identifying a destination for the customer traffic, identifying the first pseudowire for forwarding the customer traffic and forwarding the customer traffic via the first pseudowire to the second switching device.

6 Claims, 6 Drawing Sheets

PSEUDOWIRE CIRCUIT EMULATION

BACKGROUND INFORMATION

Telecommunication service providers have been increasing the number of services available to subscribers. As a result, a telecommunications service provider must often modify existing hardware components and/or add new components to its network to support these new services. The telecommunications service provider may also make frequent changes to equipment to support changes or upgrades to existing services provided to customers. Making these changes/additions to the network takes considerable time. For example, in a circuit-switched network utilizing digital cross-connects (DXCs), when a customer changes or upgrades a particular service, changes must typically be made at each DXC in a circuit associated with the particular service. Implementing changes in this manner takes considerable time and resources.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention. Instead, the scope of the invention is defined by the appended claims and their equivalents.

Implementations described herein relate to a network architecture that provides for routing customer traffic using packet switching. The packet switching may be accomplished using a number of distributed switching devices that enable moves, adds or changes associated with the customer to be accomplished in an efficient manner regardless of the protocols or customer interfaces being used.

Figure 1:
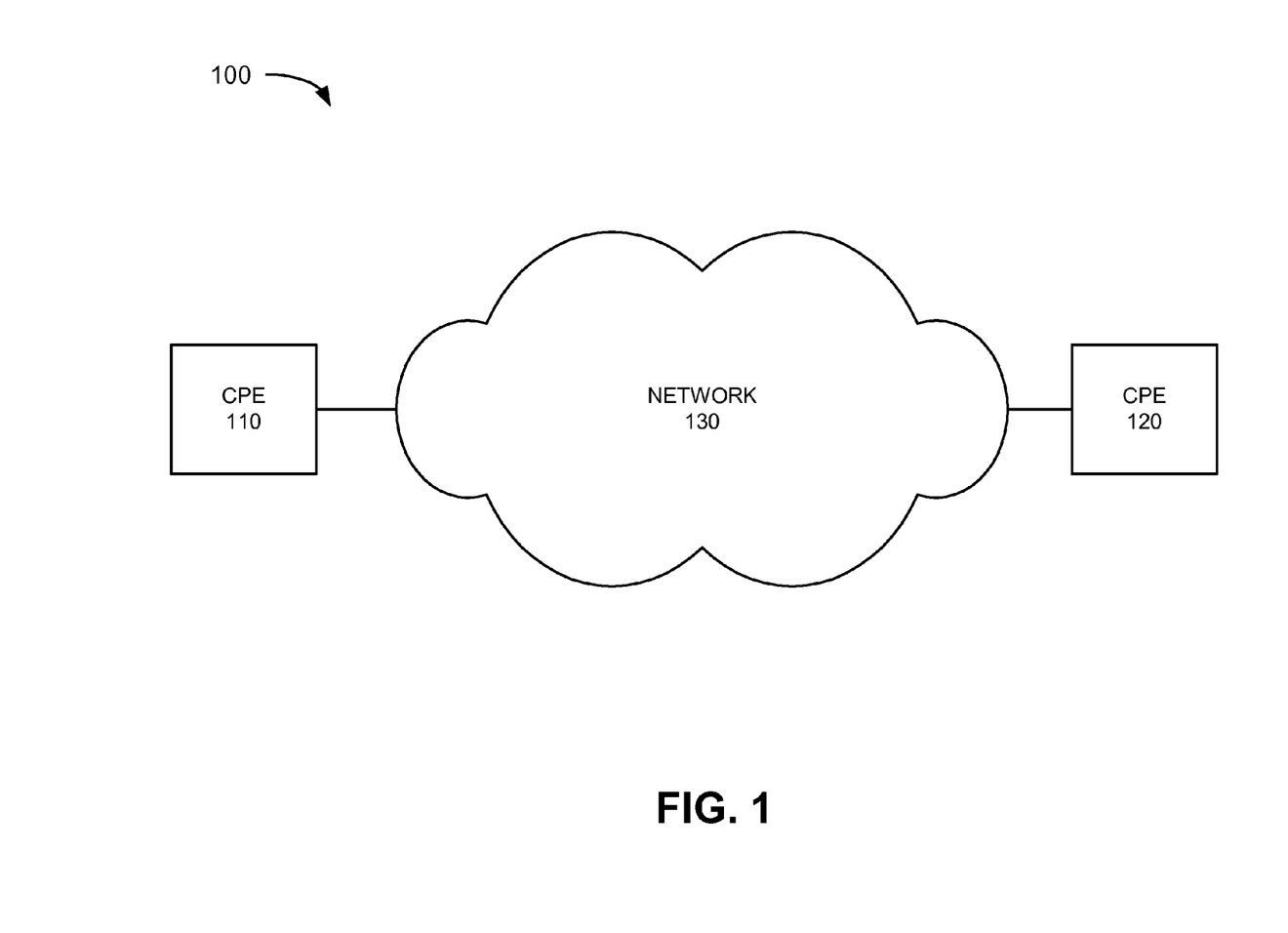
FIG. 1 illustrates an exemplary network in which systems and methods described herein may be implemented.

FIG. 1 is a block diagram of an exemplary network 100 in which systems and methods described herein may be implemented. Network 100 may include customer premises equipment (CPE) 110, CPE 120 and network 130. The number of elements illustrated in FIG. 1 is provided for simplicity. It should be understood that network 100 may include additional elements, such as additional CPE components. CPE 110 and 120 may represent any customer provided equipment, such as time division multiplexed (TDM) circuits, a telephone system (e.g., a private branch exchange (PBX), a voice over Internet protocol (VoIP) system), one or more servers, one or more routers, a network, such as a local area network (LAN) or wide area network (WAN) associated with a customer, or other devices/systems associated with a customer. CPE 110 and CPE 120 may transmit data to and receive data from network 130 via any number of protocols, such as Ethernet, Frame Relay, asynchronous transfer mode (ATM), time division multiplexing (TDM), Internet protocol (IP), etc. CPE 110 and CPE 120 may be associated with the same customer or different customers. For example, CPE 110 and CPE 120 may represent origination and destination devices associated with a dedicated private communication service between CPE 110 and CPE 120 that may be provided by a service provider associated with network 130. Alternatively, CPE 110 and CPE 120 may represent different entities/customers that are provided with shared or dedicated communication services provided by a service provider associated with network 130.

Network 130 may represent a network used to route customer traffic to/from various devices in network 100, such as CPE 110 and CPE 120. Network 130 may represent a demarcation point in network 100 between conventional circuit switched components and packet switched components. In an exemplary implementation, network 130 may provide support for legacy equipment associated with CPE 110 and CPE 120. For example, as described above, CPE 110 and CPE 120 may be associated with TDM equipment. Network 130, as described in detail below, may use a distributed packet switching architecture to route voice and/or data to and from CPE 110 and CPE 120.

Figure 2:
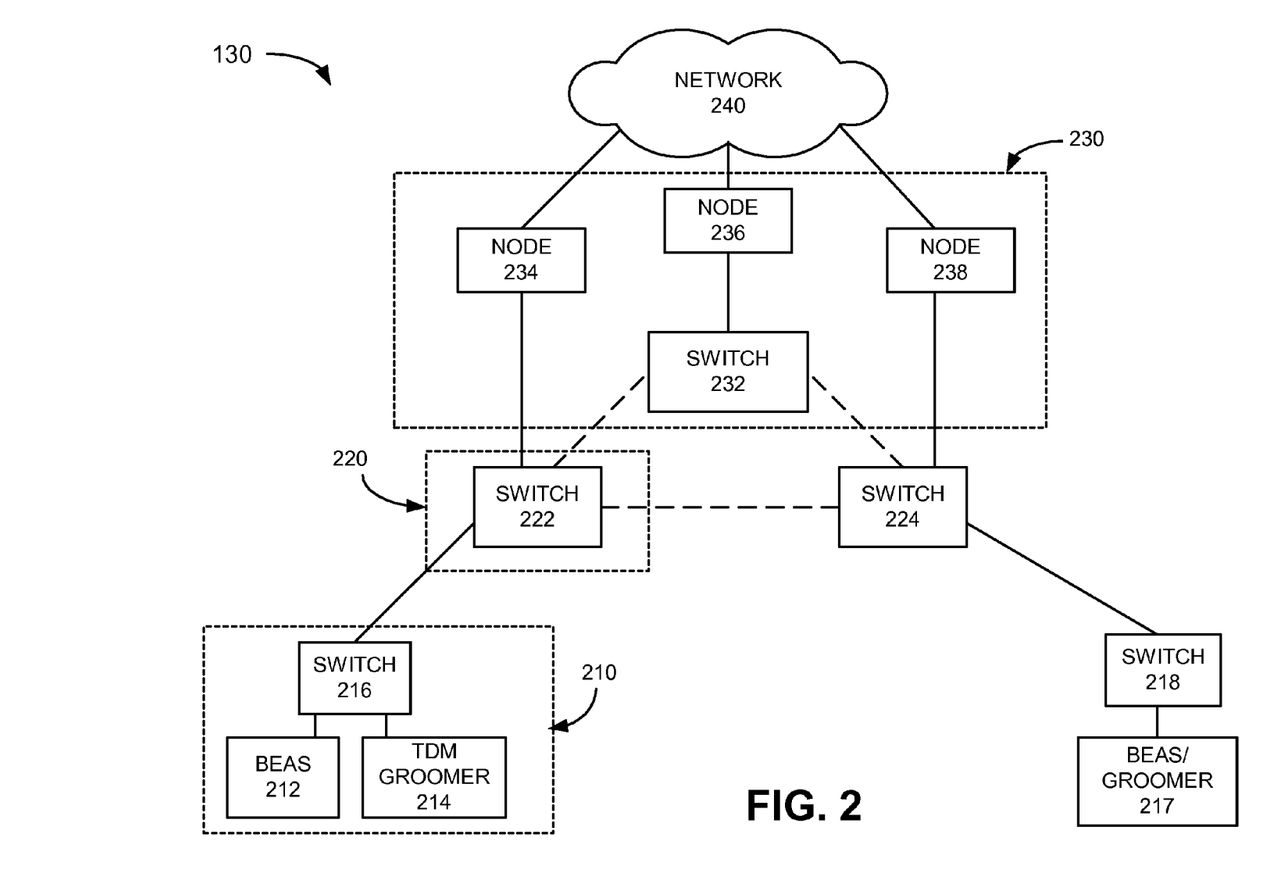
FIG. 2 illustrates an exemplary configuration of a portion of the network of FIG. 1.

FIG. 2 illustrates an exemplary implementation of network 130. Referring to FIG. 2, network 130 may include point of presence (POP) 210, building Ethernet aggregation system (BEAS)/groomer 217, switch 218, hub 220, switch 224, hub 230 and network 240. The exemplary configuration illustrated in FIG. 2 is provided for simplicity. It should be understood that network 130 may include more or fewer devices than illustrated in FIG. 2.

POP 210 may represent a local or metro POP and may include BEAS 212, TDM groomer 214 and switch 216. It should be understood that POP 210 may include additional components, such as additional switches, routers, etc. In general, POP 210 may act as a demarcation point where circuit switched network traffic (e.g., TDM traffic) is converted to packet switched traffic and/or other packet switched traffic (e.g., Ethernet traffic) is aggregated and forwarded to other devices in network 130.

BEAS 212 may aggregate Ethernet related customer traffic in a particular customer location (e.g., building, campus, etc.) associated with, for example, CPE 110. BEAS 212 may forward the aggregated customer traffic to switch 216 using Ethernet, Gigabit Ethernet, etc. In some implementations, BEAS 212 may also encapsulate the received data in accordance with the synchronous optical network (SONET) standard, via one or more plesiochronous circuits (e.g., DS1, DS3 circuits). BEAS 212 may also aggregate and forward data via other transport mechanisms/protocols. In the case of SONET, BEAS 212 may forward the data in accordance with optical carrier level 3 (OC3), OC12, etc., based on the amount of data and the particular user requirements.

TDM groomer 214 may receive TDM traffic streams from CPE 110 and may encapsulate the data into packets for use with a packet switching protocol. For example, TDM groomer 214 may receive a number of TDM connections from CPE 110 and form data link layer (i.e., layer 2) packets based on the received data streams.

Switch 216 may be a layer 2 switch that receives data, such as Ethernet data, from BEAS 212 and TDM groomer 214. Switch 216 may include forwarding logic that performs a lookup based on the source and destination address information included in the header of the received data packets. Switch 216 may also form logical connections with other devices in network 130. A pseudowire is an example of such a connection between two devices over a packet switched network that essentially emulates the attributes of a circuit-switched connection, such as a leased T1 line. In each case, switch 216 may forward packet switched traffic to other devices in network 130, such as hub 220.

Hub 220 may represent a metro hub that receives data from a number of POPs, such as POP 210 and other POPs (not shown), and may include switch 222. Switch 222 may be a layer 2 switch that forwards data packets to other devices in network 130 based on information in the headers of the received data packets. For example, switch 222 may forward data to switch 224 or switch 232, as illustrated by the dotted lines in FIG. 2 or to node 234, as also illustrated in FIG. 2.

Hub 230 may represent a metro hub and/or a long distance hub. Hub 230 may include switch 232, node 234, node 236 and node 238. It should be understood that hub 230 may include additional elements (e.g., switches, nodes, routers, etc.) Switch 232 may represent a layer 2 switch that receives packets from other devices in network 130, such as switches 222 and 224. Switch 232 may also receive data from one or more of nodes 234, 236 and 238, as described in more detail below.

Nodes 234, 236 and 238 may each represent, for example, service edge nodes with respect to network 240. That is, nodes 234, 236 and 238 may represent ingress/egress nodes for routing data to/from network 240. In an exemplary implementation, nodes 234, 236 and 238 may forward data via network 240 using multi-protocol label switching (MPLS), as described in detail below.

Network 240 may include one or more packet switched networks, such as the Internet, an intranet, a local area network (LAN), a wide area network (WAN), or another type of network that is capable of transmitting data from a source device to a destination device. In an exemplary implementation, network 240 may include an MPLS core network that uses label switching paths (LSPs) to route data.

For example, nodes 234, 236 and 238 may receive data packets with labels included in the header. Routing logic within each respective node may use the label information to identify an outgoing interface on which to forward the data packet, as opposed to using the source and destination address information in the header to identify an outgoing interface.

BEAS/groomer 217 may perform similar functions as BEAS 212 and TDM groomer 214. That is, BEAS/groomer 217 may aggregate Ethernet traffic and also encapsulate TDM streams into packets. Switch 218 may be a layer 2 switch and may perform functions similar to switch 216.

In an exemplary implementation, POP 210, hub 220, hub 230, BEAS/groomer 217, switch 218, switch 224 and network 240 may be associated with a telecommunications service provider that provides various services to users/subscribers, such as one or more subscribers represented by CPE 110 and CPE 120. The services may include VoIP services, private line services or other services. In each case, components in network 130 may forward traffic using packet switching via pseudowires, as opposed to forwarding traffic via conventional circuit-switched components, such as DXCs. For example, network 130 may provide digital signal zero (DS0) and DS1 emulation for customer traffic using pseudowire emulation (PWE) in accordance with the PWE3 standard, as described in more detail below.

Figure 3:
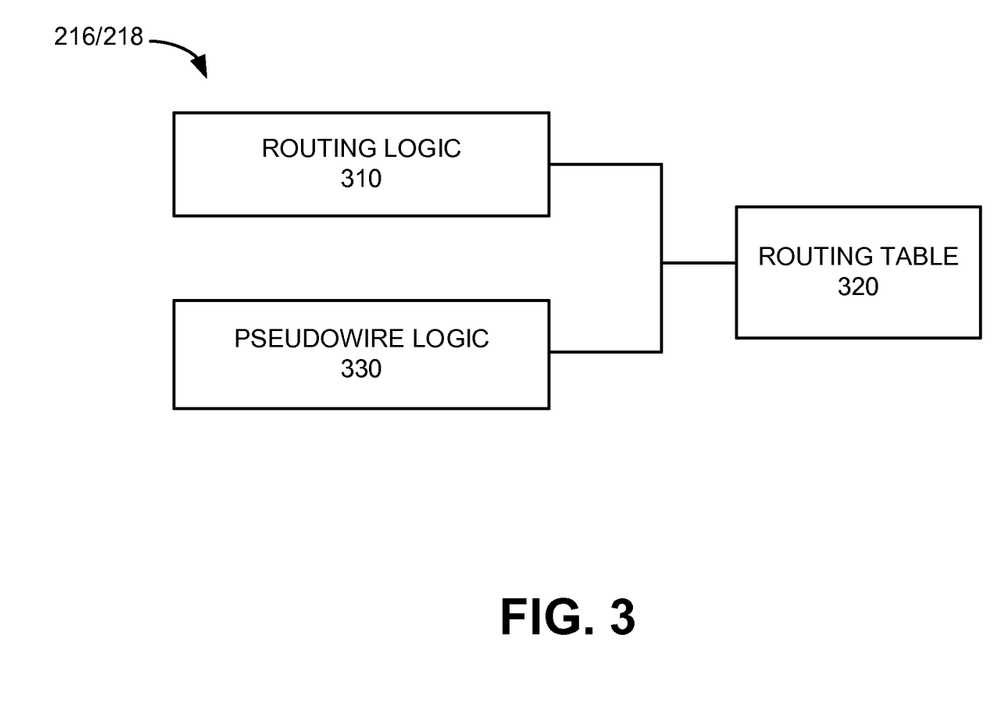
FIG. 3 illustrates an exemplary configuration of one of the switching devices of FIG. 1.

FIG. 3 illustrates an exemplary configuration of a switch, such as switch 216. Switch 218 and one or more of the other switches in FIG. 2 (e.g., switches 222, 224 and 232) may be configured in a similar manner. Referring to FIG. 3, switch 216 may include routing logic 310, routing table 320 and pseudowire logic 330. The number of components shown in FIG. 3 is provided for simplicity. It should be understood that other devices/components, such as input output devices, buffers, etc., may be included in switch 216.

Routing logic 310 may include a processor, microprocessor, application specific integrated circuit (ASIC), field programmable gate array (FPGA) or other processing logic that receives data packets and identifies forwarding information for the data packets. Routing logic 310 may then forward the data via the appropriate output interface/port (not shown) on switch 216.

Routing table 320 may include source address information, destination address information and output logical or physical interface, port or channel information for forwarding data packets. Routing logic 310 may also include MPLS labels used to route data in network 130 and pseudowire header information used to route data via pseudowires in network 130. Routing logic 310 may use this information to identify an output logical or physical interface, port or channel on which to forward received data packets, as opposed to performing a lookup based on the source and destination address information included in the header of the data packet. For example, in one implementation, routing table 320 may include an incoming label field, an output interface field and an outgoing label field associated with a number of label switching paths (LSPs) that include switch 216. In this case, routing logic 310 may access routing table 320 to identify forwarding information based on the label.

Pseudowire logic 330 may establish bi-directional pseudowires between various devices in network 130. For example, pseudowire logic 330 of switch 216 may establish an inter-metro pseudowire with switch 218. Pseudowire logic 330 of switch 216 may also establish a pseudowire with switch 218 via a MPLS network, such as via network 240, as described in detail below. To establish the pseudowires, pseudowire logic 330 may send control messages, such as label related information to establish one or more LSPs between the desired endpoints of the pseudowire to be used to route the data. The LSPs may act as pseudowires for transmitting data over the path. When transmitting data via the pseudowires, a pseudowire header may be included in the packets. The pseudowire header may include sequencing information, length information and timing information associated with the payload.

Switch 216 may also include one or more queues via which the data packet will be output. In one implementation, switch 216 may include a number of queues associated with a number of different ports/interfaces via which switch 216 may forward data packets.

Switch 216/218, as described briefly above, may determine data forwarding information for data packets. The components in switch 216 and 218 may include software instructions contained in a computer-readable medium, such as a memory. A computer-readable medium may be defined as one or more memory devices and/or carrier waves. The software instructions may be read into memory from another computer-readable medium or from another device via a communication interface. The software instructions contained in memory may cause the various logic components to perform processes that will be described later. Alternatively, hardwired circuitry may be used in place of or in combination with software instructions to implement processes described herein. Thus, systems and methods described herein are not limited to any specific combination of hardware circuitry and software.

Figure 4:
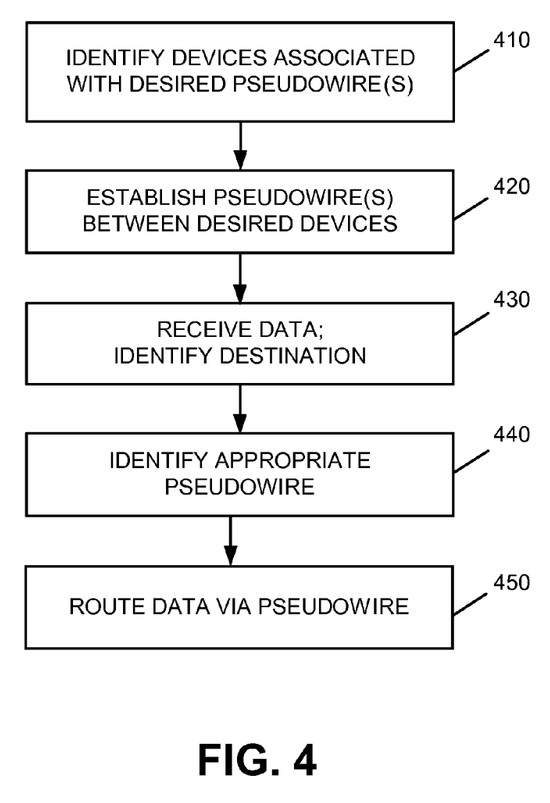
FIG. 4 is a flow diagram illustrating exemplary processing by various devices illustrated in FIG. 1.
Figure 5A:
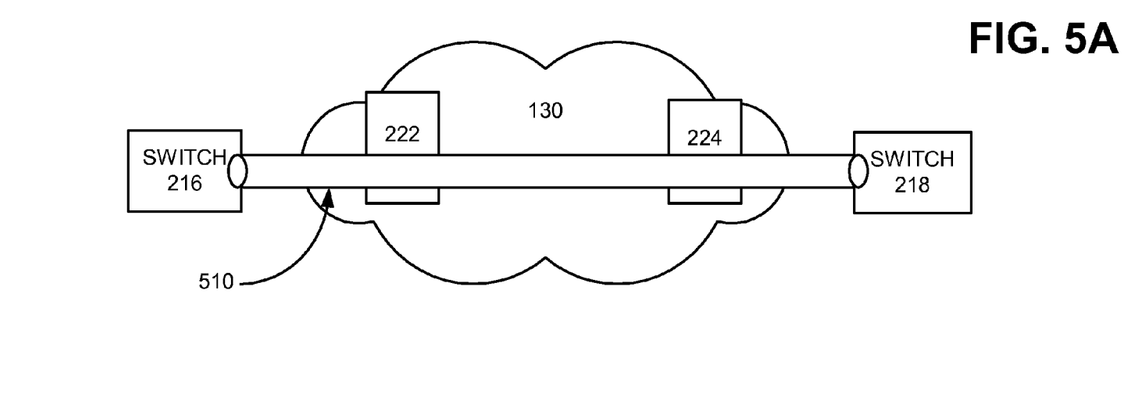
FIGS. 5A and 5B are diagrams illustrating exemplary pseudowires formed in the network of FIG. 2.

FIG. 4 is a flow diagram illustrating exemplary processing associated with establishing a pseudowire in network 130 and routing data via the pseudowire. Processing may begin by identifying origination and destination devices associated with a desired pseudowire (act 410). For example, a service provider associated with network 130 may wish to set up a private line service between CPE 110 and CPE 120. In this case, the service provider may set up a pseudowire between switches 216 and 218 (act 410). A pseudowire, as discussed briefly above, is a connection between two devices over a packet switched network. To set up the pseudowire, switch 216 may exchange signaling information with switch 218 and other devices along the pseudowire, such as labels and pseudowire header information, in accordance with the PWE3 standard (act 420). FIG. 5A schematically illustrates a pseudowire 510 established between switches 216 and 218. As illustrated, pseudowire 510 provides a tunnel-like path from switch 216 to switch 218 via switches 222 and 224. In this case, pseudowire 510 may correspond to an inter-metro pseudowire that does not require access to a long distance network, such as network 240. Pseudowire 510 emulates the essential attributes of a service, such as a T1 leased line service. Once pseudowire 510 is established, data may be transmitted via the pseudowire, as described in detail below.

Figure 5B:
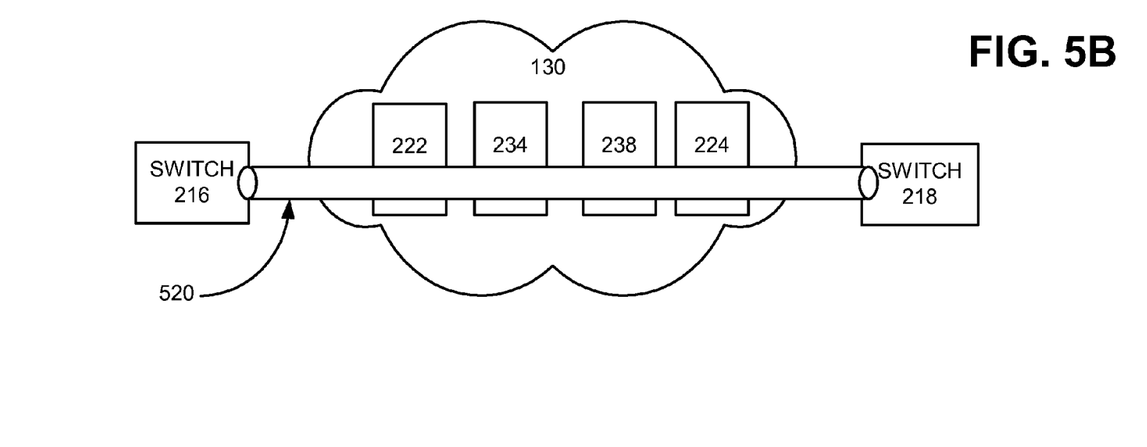

In some instances, the service provider associated with network 130 may wish to establish a pseudowire via a long distance network. For example, the service provider may provide long distance VoIP service to a customer at CPE 110 via network 240. Network 240, as described briefly above, may be a core MPLS network that forwards data based on label information included in the headers of the packets. In this example, switch 216 may establish pseudowire 520 as schematically illustrated in FIG. 5B. As illustrated, pseudowire 520 may pass through a number of devices, such as switch 222, nodes 234 and 238, switch 224, and may terminate at switch 218. Similar to pseudowire 510, pseudowire 520 may be a bi-directional pseudowire that allows data to flow in both directions. In addition, to establish pseudowire 520, switches 216 and 218 may exchange control messages in accordance with the PWE3 standard.

Once the pseudowires are established (e.g., pseudowires 510 and 520), the pseudowires may be used to forward data. For example, assume that switch 216 receives data (act 430). Further assume that the data is a long distance call from a customer at CPE 110 intended for a customer coupled to CPE 120. In this case, routing logic 310 may identify the intended destination for the call and determine whether a pseudowire has been established to a network device coupled to the destination party (act 430).

In this case, assume that pseudowire 520 has been established and routing logic 310 identifies pseudowire 520 as the appropriate pseudowire on which to forward the data (act 440). Routing logic 310 may then identify the appropriate output port/interface on switch 310 and forward the data via pseudowire 520 (act 450). In this manner, pre-configured pseudowires may be used to route data via network 130.

In another instance, the data received by switch 216 may be associated with a dedicated service, such as a private line service between CPE 110 and CPE 120. In this case, switch 216 may route data via pseudowire 510 which traverses switches 222 and 224 and terminates at switch 218. Pseudowire 510 may then provide, for example, DS0 or DS1 circuit emulation for the traffic.

In each case, using a distributed architecture including a number of switching devices (e.g., layer 2 switching devices) enables more automated provisioning with respect to routing data. For example, suppose that a customer with T1 service in a particular office location moves to another office location at a different part of the city. In this case, the end point (i.e., origination or destination) of the pseudowire associated with the particular dedicated service may simply be changed at a switch coupled to the customer location (e.g., switch 216 or switch 218). A pseudowire may then be established to provide the emulated T1 service without having to physically make alterations to circuit-switched components, such as DXCs, as would be required in conventional systems.

Figure 6:
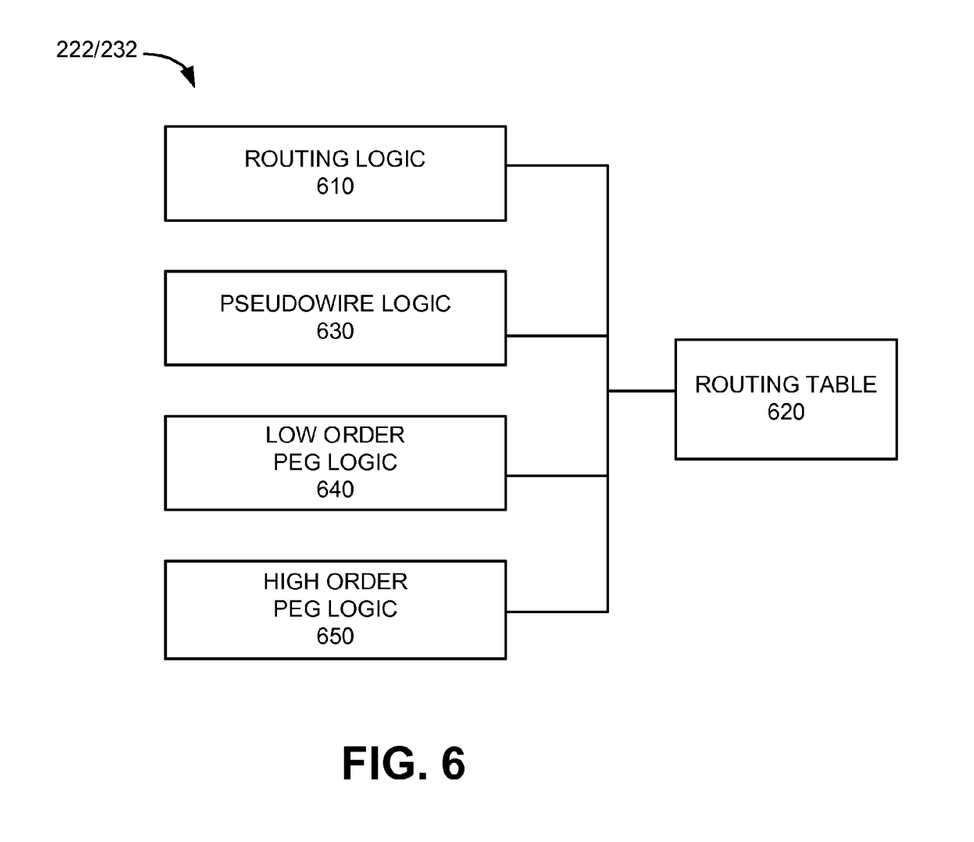
FIG. 6 illustrates an exemplary configuration of one of the switching devices of FIG. 1.

In some instances, one or more devices in network 130 may be used to aggregate data for forwarding via higher capacity transport pipes. FIG. 6 illustrates an exemplary configuration of switch 222 or 232 for aggregating various emulated circuits (e.g., DS0, DS1, etc.) circuits into higher transport bandwidth pipes. Referring to FIG. 6, switch 222 may include routing logic 610, routing table 620, pseudowire logic 630, low order pseudowire Ethernet groomer (PEG) logic 640 and high order PEG logic 650.

Routing logic 610, routing table 620 and pseudowire logic 630 may perform functions similar to those discussed above with respect to routing logic 310, routing table 320 and pseudowire logic 330 discussed above with respect to FIG. 3. Low order PEG logic 640 may aggregate emulated circuits, such as DS0 and DS1 circuits, into a higher bandwidth transport pipe. For example, low-order PEG logic 640 may receive data transmitted at a DS0 rate and/or a DS1 rate and aggregate the received traffic for transmitting using, for example, an OC48 rate, an OC192 rate, etc. Low-order PEG logic 640 may therefore be able to support traffic associated with a number of circuits, including VoIP switches.

High order PEG logic 650 may provide hierarchical network grooming at even higher bandwidths. For example, high order PEG logic 650 may receive traffic, such as traffic transmitted at an OC3 rate, an OC12 rate, an OC48 rate, a Gigabit Ethernet rate, etc., and aggregate the traffic for transmitting at, for example, an OC192 rate, 10 Gigabit Ethernet rate, etc. In this manner, emulated OC-n TDM service may be supported to allow a customer to migrate existing services to a packet switched service. This may allow system 100 to support customer traffic, including very high speed, high bandwidth traffic.

In the exemplary implementation illustrated in FIG. 6, low order PEG logic 640 and high order PEG logic 650 are illustrated as residing in the same switch (e.g., switch 222 or switch 232). In other implementations, low order PEG logic 640 and high order PEG logic 650 may reside in different switches. For example, switch 222 may include low order PEG logic 640 and switch 232 may include high order PEG logic 650. In each case, the switch may represent a customer edge device where one end of an emulated service originates or terminates.

Implementations described herein provide for routing data within a network using pseudowires. The data may be associated with a number of different services provided to customers that involve any number of protocols and interfaces. Using a distributed packet switching approach also allows moves, adds or changes in customer services to be performed in a simplified manner. Further, lower operational costs and better survivability may also be achieved using distributed packet switching.

The foregoing description of exemplary implementations provides illustration and description, but is not intended to be exhaustive or to limit the invention to the precise form disclosed. Modifications and variations are possible in light of the above teachings or may be acquired from practice of the invention. For example, various features have been described above with respect to various switching devices in network 130. In some implementations, the functions performed by multiple devices in network 130 may be performed by a single device. In other implementations, some of the functions described as being performed by one of these devices may be performed by other one of these components or another device/component.

In addition, while series of acts have been described with respect to FIG. 4, the order of the acts may be varied in other implementations. Moreover, non-dependent acts may be implemented in parallel.

It will be apparent to one of ordinary skill in the art that various features described above may be implemented in many different forms of software, firmware, and hardware in the implementations illustrated in the figures. The actual software code or specialized control hardware used to implement the various features is not limiting of the invention. Thus, the operation and behavior of the aspects of the invention were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as a processor, a microprocessor, an application specific integrated circuit, or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    establishing a first pseudowire between a first switching device and a second switching device;
    receiving customer traffic, the customer traffic including time division multiplexed data;
    formatting the time division multiplexed data as packets;
    identifying a destination for the customer traffic;
    identifying the first pseudowire for forwarding the customer traffic;
    forwarding the customer traffic as packets via the first pseudowire to the second switching device;
    provisioning changes associated with a customer by changing an origination or a destination associated with the first pseudowire and without having to make changes associated with circuit-switched components associated with the customer;
    aggregating data associated with emulated circuits, the data being received at a first bandwidth and forwarded at a second bandwidth higher than the first bandwidth, wherein the first bandwidth corresponds to one or more of optical carrier level 3, optical carrier level 12, optical carrier level 48 or gigabit Ethernet and the second bandwidth corresponds to one of optical carrier level 192 or 10 gigabit Ethernet; and
    forwarding the aggregated data via the first pseudowire.

2. The method of claim 1, wherein the forwarding the customer traffic comprises using a label switching path.

3. The method of claim 1, further comprising:
    aggregating Ethernet traffic from a number of sources; and
    forwarding the aggregated Ethernet traffic to the first switching device.

4. The method of claim 3, further comprising:
    forwarding, by the first switching device, the aggregated Ethernet traffic via the first pseudowire.

5. The method of claim 1, wherein the aggregating data comprises:
    aggregating the data at a third switching device coupled to the first switching device.

6. A system, comprising:
    means for establishing a first pseudowire between a first switching device and a second switching device;
    means for receiving customer traffic, the customer traffic including time division multiplexed data;
    means for formatting the time division multiplexed data as packets;
    means for identifying a destination for the customer traffic;
    means for identifying the first pseudowire for forwarding the customer traffic;
    means for forwarding the customer traffic via the first pseudowire to the second switching device;
    means for aggregating Ethernet traffic from a number of sources;
    means for forwarding the aggregated Ethernet traffic to the first switching device;
    means for forwarding the aggregated Ethernet traffic via the first pseudowire;
    means for aggregating data associated with emulated circuits, the data being received at a first bandwidth and forwarded at a second bandwidth higher than the first bandwidth, wherein the first bandwidth corresponds to one or more of optical carrier level 3, optical carrier level 12, optical carrier level 48 or gigabit Ethernet and the second bandwidth corresponds to one of optical carrier level 192 or 10 gigabit Ethernet;
    means for forwarding the aggregated data via the first pseudowire; and
    means for provisioning at least one of changes or additions to customer services by changing an origination or destination associated with the first pseudowire and without having to make changes to circuit-switched components associated with the customer.

* * * * *